US007716188B2

(12) United States Patent
Feichtinger et al.

(10) Patent No.: US 7,716,188 B2
(45) Date of Patent: May 11, 2010

(54) METHOD FOR CHECKING THE COMPLETENESS AND CONSISTENCY OF AN INFORMATION LIBRARY

(75) Inventors: Dieter Feichtinger, Herzogenaurach (DE); Georg Görtler, Baiersdorf (DE); Carsten Sinz, Tübingen (DE)

(73) Assignee: Siemens Aktiengesellschaft, Munich (DE)

( * ) Notice: Subject to any disclaimer, the term of this patent is extended or adjusted under 35 U.S.C. 154(b) by 550 days.

(21) Appl. No.: 11/125,026

(22) Filed: May 9, 2005

(65) Prior Publication Data

US 2006/0050654 A1 Mar. 9, 2006

(30) Foreign Application Priority Data

May 10, 2004 (DE) ....................... 10 2004 023 634

(51) Int. Cl.
*G06F 7/00* (2006.01)

(52) U.S. Cl. ....................................................... 707/690

(58) Field of Classification Search ................. 707/200, 707/101, 10, 102

See application file for complete search history.

(56) References Cited

U.S. PATENT DOCUMENTS

| | | | | |
|---|---|---|---|---|
| 5,233,513 | A * | 8/1993 | Doyle | 705/7 |
| 5,307,262 | A * | 4/1994 | Ertel | 705/2 |
| 5,485,409 | A * | 1/1996 | Gupta et al. | 726/25 |
| 5,734,837 | A * | 3/1998 | Flores et al. | 705/7 |
| 5,807,256 | A * | 9/1998 | Taguchi et al. | 600/425 |
| 5,896,530 | A * | 4/1999 | White | 718/102 |
| 5,910,897 | A * | 6/1999 | Dangelo et al. | 716/19 |

(Continued)

FOREIGN PATENT DOCUMENTS

DE 196 44 481 A1 4/1997

(Continued)

OTHER PUBLICATIONS

XML Path Language (XPath) 2.0, W3C Working Draft Aug. 16, 2002.

(Continued)

*Primary Examiner*—John R. Cottingham
*Assistant Examiner*—Mohammed R Uddin
(74) *Attorney, Agent, or Firm*—Brinks, Hofer, Gilson & Lione

(57) ABSTRACT

To simplify the creation and handling of an information library which is associated with a number of modules from which a device is put together in accordance with a prescribed configuration structure, a method for checking the completeness and consistency of the information library is provided. Accordingly, the information library comprises a number of information packets, each of which contains an information core and a meta-statement which defines the association between the information packet and at least one module a context library is prescribed which comprises a number of context units, each context unit of which contains a reference to a combination of modules which requires the presence of the information packet, and the information library is checked for completeness and consistency by testing whether each configuration of modules which is valid in accordance with the configuration structure and each affected context unit which refers to a combination contained in the configuration have at least one corresponding information packet available which, in accordance with its meta-statement, is compatible with the configuration and is defined as being associated with the combination.

18 Claims, 6 Drawing Sheets

U.S. PATENT DOCUMENTS 5,920,867 A * 7/1999 Van Huben et al. ......... 707/101
6,039,168 A * 3/2000 Head, III ............... 198/341.07
6,076,652 A * 6/2000 Head, III ............... 198/341.07
6,125,442 A * 9/2000 Maves et al. ................ 712/220
6,175,948 B1 * 1/2001 Miller et al. ................... 716/7
6,253,369 B1 * 6/2001 Cloud et al. ................ 717/136
6,275,976 B1 * 8/2001 Scandura .................... 717/120
6,300,880 B1 * 10/2001 Sitnik .................... 340/825.25
6,311,144 B1 * 10/2001 Abu El Ata .................... 703/2
6,424,949 B1 * 7/2002 Deaton et al. ................. 705/14
6,424,996 B1 * 7/2002 Killcommons et al. ...... 709/206
6,467,605 B1 * 10/2002 Head, III ............... 198/341.07
6,560,569 B1 * 5/2003 Abu El Ata .................... 703/2
6,633,878 B1 * 10/2003 Underwood ................ 707/100
6,708,138 B1 * 3/2004 Zhang et al. ................ 702/182
7,047,237 B2 * 5/2006 Suzuki et al. .................. 707/3
7,047,518 B2 * 5/2006 Little et al. ................. 717/108
7,210,143 B2 * 4/2007 Or et al. ..................... 717/174
7,278,130 B2 * 10/2007 Iborra et al. ................ 717/101
7,344,496 B2 * 3/2008 Iliff ............................ 600/300
2002/0002474 A1 * 1/2002 Michelson et al. ............. 705/3
2002/0169636 A1 * 11/2002 Eggers et al. .................. 705/3
2002/0186818 A1 * 12/2002 Arnaud et al. .............. 378/165
2003/0033588 A1 * 2/2003 Alexander .................. 717/107
2003/0037321 A1 * 2/2003 Bowen ....................... 717/149
2003/0233218 A1 * 12/2003 Schilling ..................... 703/11
2004/0059200 A1 * 3/2004 Iliff ............................ 600/300
2004/0148284 A1 * 7/2004 Baker ............................ 707/6
2004/0157199 A1 * 8/2004 Eggert et al. ................ 434/262
2005/0110640 A1 * 5/2005 Chung ..................... 340/572.1
2005/0144043 A1 * 6/2005 Holland et al. ................. 705/3
2005/0198003 A1 * 9/2005 Duevel et al. .................. 707/1
2005/0223043 A1 * 10/2005 Randal et al. ............... 707/200
2005/0249196 A1 * 11/2005 Ansari et al. ................ 370/352
2006/0026205 A1 * 2/2006 Butterfield ............... 707/104.1
2006/0235855 A1 * 10/2006 Rousseau et al. ............ 707/100
2007/0061393 A1 * 3/2007 Moore ........................ 709/201
2007/0106750 A1 * 5/2007 Moore ........................ 709/217
2007/0106751 A1 * 5/2007 Moore ........................ 709/217
2007/0106752 A1 * 5/2007 Moore ........................ 709/217
2007/0118540 A1 * 5/2007 Guo ........................... 707/100
2007/0121794 A1 * 5/2007 Migault et al. ........... 379/15.01
2007/0239843 A1 * 10/2007 Knowles et al. ............. 709/217

FOREIGN PATENT DOCUMENTS

DE 197 51 273 A1 5/1999
DE 202 09 766 U1 10/2002

OTHER PUBLICATIONS

German Office Action dated Feb. 23, 2007 relating to DE 10 2004 023 634.8-53 and English translation.

* cited by examiner

FIG 3

```
<Config auto-ns1:noNamespaceSchemaLocation="Config.xsd
      xmlns:xsi="http://www.w3.org/2001/XMLSchema-instance">
   <Structure>
      <Type IDREF="INT_ConsoleType" MinOccurs="1" MaxOccurs="1">
         <Item IDREF="INI_ConsoleType_Sat"/>
         <Item IDREF="INI_ConsoleType_Main">
            <SubType IDREF="INT_System" MinOccurs="1" MaxOccurs="1">
               <! - - Harmony - ->
               <Item IDREF="INI_System024">
                  <SubType IDREF="INT_Comp_MPCU" Default="INI_Comp_MPCU300"
                           ReadOnly="true" MinOccurs=" 1" MaxOccurs="1">
                     <Item IDREF="INI_Comp_MPCU300"/>
                  </SubType>
                  <SubType IDREF="INT_Comp_RXNumOf" Default="INI_Comp_RXNumOf1"
                           MinOccurs="1" MaxOccurs="1">
                     <Item IDREF="INI_Comp_RXNumOf1"/>
                     <Item IDREF="INI_Comp_RXNumOf2"/>
                  </SubType>
                  <SubType IDREF=" INT_Comp_ReceiverNumOf" MinOccurs="1"
                           MaxOccurs="1">
                     <Item IDREF="INI_Comp_ReceiverNumOf2"/>
                     <Item IDREF="INI_Comp_ReceiverNumOf4">
                        <Conditions>
                           <Condition Type="INT_Comp_RXNumOf" Op="eq"
                                      Value="INI_Comp_RXNumOf2"/>
                        </Conditions>
                     </Item>
                  </SubType>
               </Item>
               <!-- Concerto --> . . .
            </SubType>
         </Item>
      </Type>
   </Structure>
</Config>
```

```
<Package ID="HLP_HP-1-181203-01-001" Name="HP-1-181203-01-001">
   <Content> ... <Content>
   <Dependencies>
      <Dependency>
         <RefType IDREF="INT_Workflow">
            <RefItem IDREF="INI_Workflow_TUNEUP"/>
         </RefType>
         <RefType IDREF="INT_System">
            <RefItem IDREF="INI_System_003"/>
         </RefType>
      </Dependency>
   </Dependencies>
</Package>

<Context>
   <RefType IDREF=" INT_System">
      <RefItem IDREF="INI_System_003"/>
   </RefType>
   <RefType IDREF="INT_Workflow">
      <RefItem IDREF="INI_Workflow_TUNEUP"/>
   </RefType>
   <RefType IDREF="INT_WorkflowMode">
      <RefItem IDREF="INI_WorkflowMode_General"/>
   </RefType>
   <RefType IDREF="INT_WorkflowSfp">
      <RefItem IDREF="INI_WorkflowSfp_SfpTuncalOpen"/>
   </RefType>
</Context>
```

4 3 5 15 11 10

METHOD FOR CHECKING THE COMPLETENESS AND CONSISTENCY OF AN INFORMATION LIBRARY

FIELD

The present invention relates, in general, to information storage on modular devices, and more particularly, to a method for checking the completeness and consistency of an information library which is associated with a number of modules from which a device can be put together in accordance with a prescribed configuration structure.

BACKGROUND

Typically, a complex technical device, such as a magnetic resonance (MR) tomography, is configured to be of modular design. This is understood to mean that the whole device can be put together from a multiplicity of individual modules, e.g. solenoids, receivers, amplifiers, treatment table etc. For each of these modules, specified above basically according to type, there are normally a plurality of variants or embodiments, e.g. various designs of treatment table, various solenoids etc., from which to select in the course of the design of a specific exemplar of the device. As such, a module is normally itself put together in turn from other modules or sub-modules. By way of example, the treatment table may comprise the modules for a chassis, a height adjustment, a support etc., with each of these modules again being able to have a plurality of variants available for selection. In addition, workflows which need to be implemented in order to set, maintain or operate the device may also be of modular structure. As such, a module may therefore contain an apparatus component, or else a software component or a workflow.

The device of the type described above may not exist in a single well-defined design. Rather, a multiplicity of different configurations of the device may exist in accordance or in line with a respective particular selection of modules. An inclusive number of all of the configurations may be represented by a "configuration structure". The configuration structure contains the reciprocal dependencies of the modules, which modules may be subunits of a "super-ordinate" module, for example. In addition, the configuration structure specifies which module or modules in a configuration may require the presence of a particular further module or modules or which module may not be able to be combined with a particular further module or modules in a configuration. A selection of modules which corresponds to the configuration structure is called a "valid" configuration. Normally, only such a valid configuration produces a working device.

Typically, a particular stock of information may need to be provided in connection with a technical device. Such stock of information includes, by way of example, documentation for the device, such as technical manuals, user manuals, programming instructions etc. However, the stock of information required in connection with the technical device may also comprise, by way of example, a parameter collection for setting the parameters of the device, configuration files, driver software or the like.

Conventionally, the information associated with the device, e.g. the manual or the parameter collection, is created individually for every configuration of the device. With the multiplicity of possible configurations for a complex technical device, such as for the MR tomography cited at the outset, matching the information to every possible configuration individually on account of the associated complexity associated may become difficult. Alternatively, in connection with a technical device, information typically provided may be equally valid for a multiplicity of configurations for the device, e.g. in the form of a universal manual which covers all possible configurations of the device equally. However, when the device is highly complex or there are a large number of configuration options, the information provided may become less manageable.

Accordingly, one approach is to select the associated information for a complex technical device of modular design dynamically, i.e. in automated fashion, from an information library which stores a stock of information covering all configurations, for each specific configuration of the device. However, a problem arises in that the information library which needs to be associated with a complex device is typically so extensive, becoming barely comprehensible or controllable any longer. Another factor contributing to this problem, in particular, is that the modular design of the device means that often a multiplicity of different experts create respective information for a sub-region of the device and put this information into the information library. Any errors or omissions which exist within the information library are therefore sometimes not identified or are identified only at an undesirably late stage.

BRIEF SUMMARY

The present invention is defined by the appended claims. This description summarizes some aspects of the present embodiments and should not be used to limit the claims.

A method which simplifies the creation and handling of an information library is associated with a device of modular design.

For the provided method, provision is made for the information library to be designed or configured so as to comprise a number of information packets, each of which contains an information core and a meta-statement. As such, the information core contains the actual information, e.g. technical documentation relating to one or more modules in the device. This association between the information packet and one or more modules is defined by the meta-statement.

In an advantageous feature, a context library is prescribed which comprises a number of context units. In this feature, each context unit contains a reference to a combination of modules which may require the presence of an information packet. The abstract term "combination" is to be understood as meaning "an individual module or a plurality in combination". The reference may accordingly point to an individual module.

A test is provided to determine whether each valid configuration of modules and each context unit affected by this valid configuration have one and only one corresponding information packet available. The context unit is "affected" by a configuration when referring to a combination of modules which is contained in this valid configuration.

An information packet "corresponds" to the context unit for a configuration when the corresponding meta-statement defines it as being compatible with the configuration and as being associated with the combination of modules which is identified by the context unit.

The information packet is "associated with a combination of modules" when it is associated with each individual module in the combination. The information packet is "compatible" with a given configuration when it is not explicitly associated with one or more modules in this configuration. The compatibility or incompatibility may also result from the configuration structure. For example, when the information packet is defined as being associated with a module "system_

001" which, in accordance with the configuration structure, is to be selected only as an alternative to another module "system_002", then the information packet is explicitly not associated with this further module and is thus incompatible with all configurations which contain the module "system_002".

If there is a corresponding information packet within each valid configuration for each affected context unit, the information library is identified as being "complete". Conversely, the information library is "incomplete" if a valid configuration has no corresponding information packet for at least one affected context unit.

If there is just one corresponding information packet within each valid configuration for each affected context unit, the information library is identified as being "consistent". Conversely, the information library is "inconsistent" if a valid configuration has at least two corresponding, and hence competing, information packets for at least one affected context unit.

The method allows local and module-based creation of an information library by a multiplicity of different editing operatives without the need to worry that the information library might be incomplete or inconsistent. This method thus enables—for example for a central project management unit—the use of the context library to define a number of situations in which the information packet is needed. A coarse structure or a content directory for the information library is therefore prescribed. The individual information packets can be created totally independently thereof, however, particularly by the experts responsible for the individual regions of the device. In particular, the association between each information packet and modules of the device can be defined individually and independently of the guideline prescribed by the context units. As such, a common information packet is produced for a plurality of context units and therefore may avoid the creation of redundant information. However, a plurality of information packets may be created for the same context unit, with each of these information packets being relevant to different configurations of the device. As such, configuration-dependent differences within the same context unit can be in differentiated forms.

In another advantageous feature, the check for completeness and consistency, which preferably takes place automatically, may effectively ensure that the guidelines prescribed by the context library are met explicitly and hence errors or gaps in the information library may be substantially reduced or even avoided.

The lack of any direct dependency by the information library on the context library and the check for completeness and consistency effectively may allow the information library to be structured as simply as possible, but at the same time in as differentiated a form as required, which means that the work involvement for creating the information library can be reduced substantially. Another factor contributing to this reduced work is that each editing operative can, by virtue of the automatic check for the completeness and consistency of the information packet, independently stipulate the association for the information packet without putting the overall concept of the information library at risk. There is no need for the editing operatives to consult before the editing operation, which would become increasingly difficult as the complexity of the information library increases and as the number of editing operatives increases. Similarly, the context library or individual context units can be changed at any time without requiring the existing information library to be restructured.

To simplify error elimination when the information library is incomplete, discovery of the incompleteness involves indication of a context unit for which there is no corresponding information packet. This can be done by indicating the corresponding context unit or equivalently by indicating the combination of modules which is identified thereby, preferably together with the indication of the corresponding configuration.

Similarly, if the information library has been found to be inconsistent, those information packets which are competing for a configuration and an affected combination are preferably indicated.

The storage of the configuration structure, of the information library and of the context library in the form of text files, are in XML (eXtensible Markup Language) format in one embodiment.

The configuration structure is stored in the form of a tree structure whose nodes or branch points each have a module arranged at them. The tree structure is understood to mean a hierarchically organized relationship and dependency network with one or more "root" modules in a topmost hierarchic level. As such, each of these "root" modules has one or more related modules on a subordinate hierarchic level, which modules may in turn have related modules on a further subordinate hierarchic level, etc.

Regarding a performance of the provided method, the performance is found to be advantageously improved when the modules of the device are divided into "type" modules and "variant" modules. As such, a "type" module (or: type node) may specify a particular type of module, e.g. "treatment table". A "variant" module (or: item node) may specify a specific variant or form of a "type" module, e.g. a specific design of the treatment table. Within the configuration structure, successive hierarchic levels are associated desirably alternately with either type modules or variant modules, and a "type" hierarchic level always has a subordinate "variant" hierarchic level.

The division of the configuration structure into type modules and variant modules may allow a simple validity check, in particular, for a prescribed configuration. This validity check may be expediently carried out using a recursive format or approach, where a configuration for modules is identified as being valid if each type module and each variant module within this configuration meets prescribed validity criteria. The validity criteria for a type module are particularly different than the validity criteria for a variant module.

The validity criteria checked for a type module are, for example, the following conditions:

- T1: The number of subordinate variant modules selected for the type module (in the configuration to be tested) within a prescribed selection region. This selection region is determined individually by the configuration structure for each type module.
- T2: All selected, subordinate variant modules meetin prescribed validity criteria for variant modules, particularly the criteria I1 to I3 introduced below.
- T3: The configuration need not, as a variant of the type module under consideration, comprise any variant modules for which this subordination is not explicitly permitted by the configuration structure.

The following validity criteria, for example, are used for a variant module:

- I1: All subordinate type modules meeting prescribed validity criteria for type modules, particularly T1 to T3.
- I2: All conditions associated with the variant module under consideration are met.

Hence, if, by way of example, the variant module under consideration is subject to the condition that the configuration contains a further module, then a check is performed to determine whether this module is actually contained in the configuration. If the variant module under consideration is subject to the condition that a further module is not be present in the same configuration, then a check is performed to determine whether this module is actually not selected in the present configuration.

I3: Unreferenced type modules and their variants need not be used in the present configuration.

Accordingly, the type module is identified as being unreferenced if it appears in the configuration structure not as a subordinate (sub)type of the variant module under consideration.

Illustrative and exemplary embodiments of the invention are described in further detail below with reference to and in conjunction with the figures.

BRIEF DESCRIPTION OF THE DRAWINGS

FIG. 3 shows extracts from XML coding for the configuration structure shown in FIG. 2, FIG. 4 shows extracts from XML coding for an information packet as shown in FIG. 1 and from XML coding for a context unit as shown in FIG. 1.

Mutually corresponding parts and variables are provided with the same reference symbols in all figures.

Figure 1:
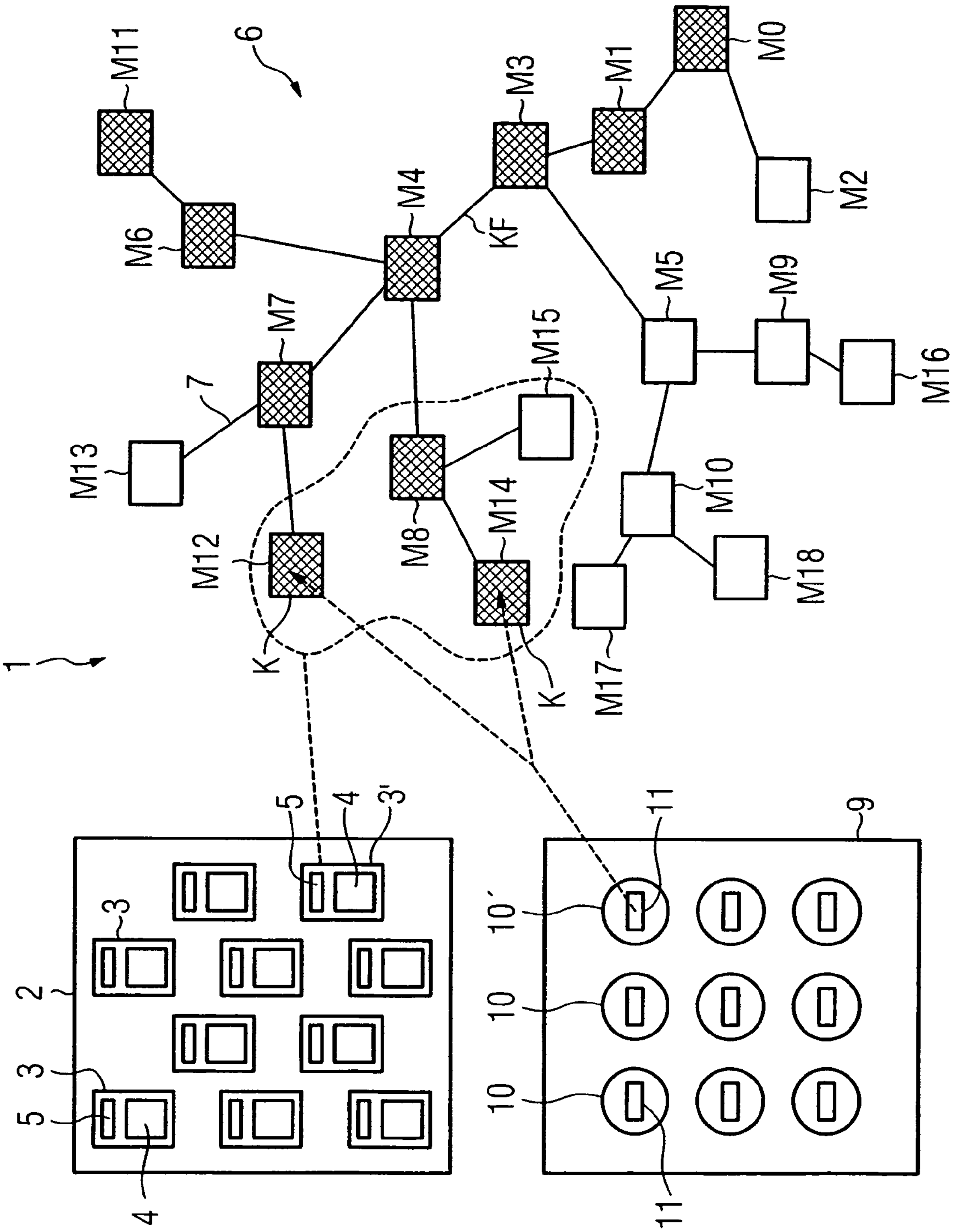
FIG. 1 schematically shows an information system with an information library which is associated with a number of modules from which a device can be put together in accordance with a prescribed configuration structure, and with a context library which indicates a number of combinations of modules which require the presence of a respective information packet.

The information system 1 shown schematically in FIG. 1 includes an information library 2 with a multiplicity of individual information packets 3, and 3'. Each information packet 3, and 3' comprises an information core 4 and a meta-statement 5. The information core 4 contains the actual information from the information packet 3, and 3'. The meta-statement 5 is used to define the association between the information packet 3, and 3' and one or more modules Mi (i=0, 1, 2, 3, . . . , 18) in a technical device 6.

The device 6 is a magnetic resonance (MR) tomography, for example. The modules Mi are parts of the tomography (hardware and/or software) and also workflows which may need to be carried out in the course of setting, maintaining or operating the tomography. As such, the information core 4 of each information packet 3, and 3' may contain, for example, technical documentation relating to one or more modules Mi, that is for a part of the tomography and/or the workflow.

The modules Mi may be grouped in dependencies which are represented by a "configuration structure" 7. The configuration structure 7 shown schematically in FIG. 1 is constructed in the manner of a tree structure and comprises a "root" module M0, which includes further modules M2-M18 as subunits.

Any selection of modules Mi which meets the dependencies contained in the configuration structure 7 and which thus produces a complete and operational device 6 is denoted as a valid configuration. A configuration KF which comprises the modules M0, M1, M3, M4, M6, M7, M8, M1, M12 and M14 is visually highlighted by way of example in FIG. 1.

The information system 1 also comprises a context library 9 with a number of context units 10, and 10'. Each context unit 10, and 10' contains a reference 11 to a desirable combination of modules Mi and thus specifies a corresponding situation which requires a corresponding information packet 3, and 3' to be present.

By way of example, FIG. 1 indicates that the context unit 10' refers to a combination K comprising the modules M12 and M14 and thus stipulates that an information packet 3, and 3' needs to be available if the modules M12 and M14 are contained in a valid configuration KF. The context library 9 may represent a content directory for documentation for the device 6, the sections of this content directory being able to be dynamically filled with the content of the information core 4 of the respective corresponding information packet 3, and 3' for any valid configuration of the device 6.

A prerequisite for this dynamic allocation is that the information library 2 is complete and consistent, that is to say that precisely one information packet 3, and 3' correspond to each affected context unit 10, and 10' for any valid configuration.

Figure 2:
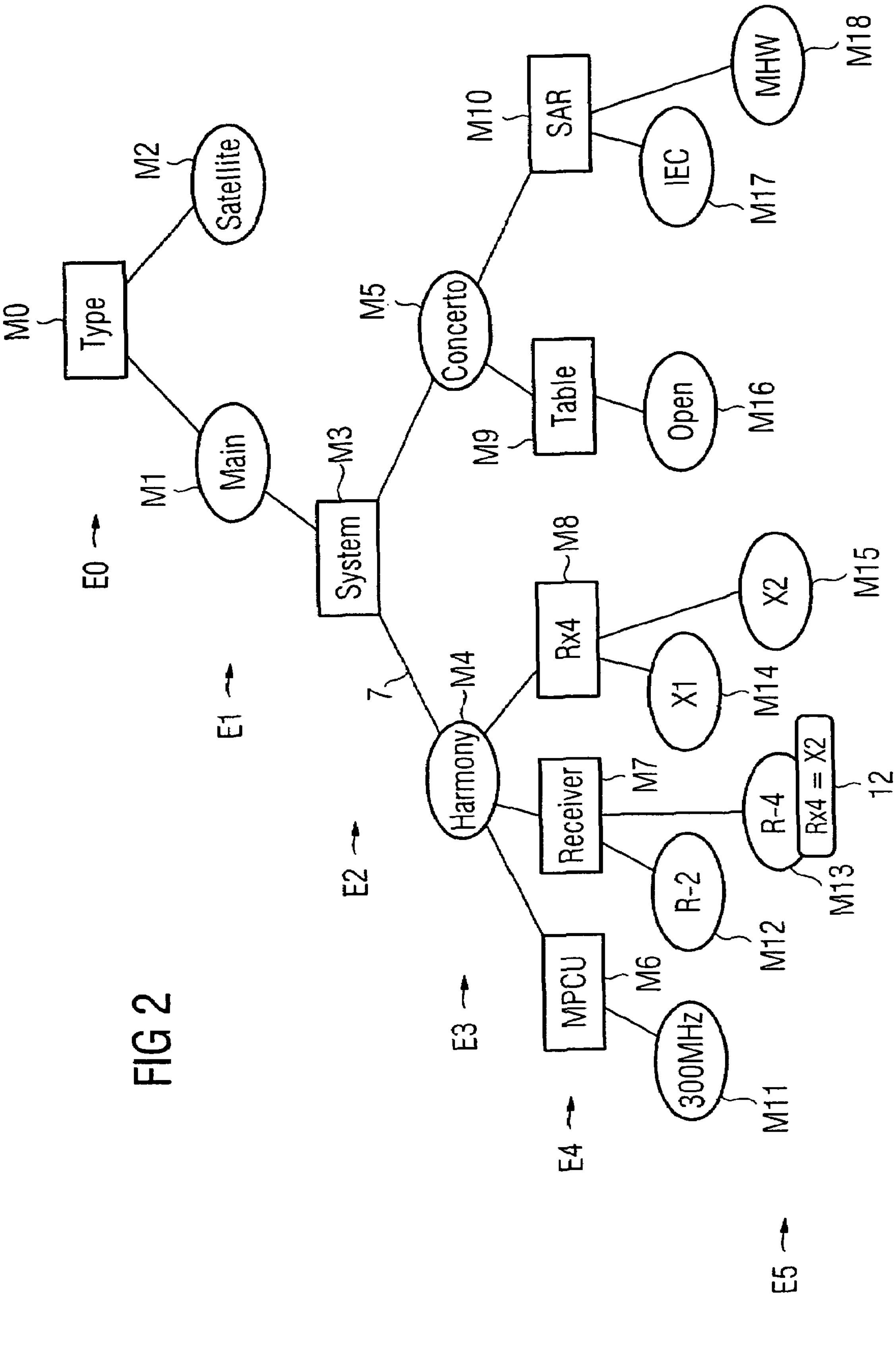
FIG. 2 shows a tree diagram for a specific embodiment of the configuration structure shown in FIG. 1.

FIG. 2 shows a specific form of the configuration structure 7 using a simple example. In this FIG. 2 illustration, the hierarchic organization of the configuration structure 7 is shown. The modules Mi are divided into type modules Mk (k=0, 3, 6-10), (which are symbolized by rectangular frames) and variant modules Ml (l=1, 2, 4, 5, 11-18), (which are symbolized by round frames). Type modules Mk, on the one hand, and variant modules Ml, on the other hand, are alternately arranged in six successive hierarchic levels Ej (j=0, 1, 2, . . . , 5), with a hierarchic level E1, E3, E5 occupied by variant modules Ml always following a super-ordinate hierarchic level E0, E2, E4, which contains the respective type modules Mk associated with these variant modules Ml.

FIG. 2 shows that within the configuration structure 7 there are two alternative variants of the "system" type (module M3), namely "harmony" (module M4) and "concerto" (module M5). The "system" variant "harmony" comprises three subcomponents of type "MPCU" (module M6) and "receiver" (module M7) and "Rx4" (module M8). The "receiver" type may in turn be chosen from two alternative variants "R-2" (module M12) and "R-4" (module M13), the latter variant being linked to a condition 12 according to which the associated variant "X2" (module 15) needs to be selected for the type "Rx4" (module M8) simultaneously when "R-4" is selected.

FIG. 3 shows extracts from a text file 13 in which the configuration structure 7 shown diagrammatically in FIG. 2 is coded in a text form corresponding to the XML (eXtensible Markup Language) standard. The type module M0 is indicated by the text sequence <Type . . . > . . . </Type>, and a subordinate type module M3, M6-M10 is accordingly indicated by <SubType . . . > . . . </SubType>. Similarly, a variant module is indicated by the text sequence <Item . . . > . . . </Item>. A particular type module Mk or variant module M1 is identified by reference IDREF=" . . . " to a unique identification name for the respective module Mi, e.g. IDREF="INT_ConsoleType" for the module M0, which is denoted as "Type" in accordance with FIG. 2. The hierarchic levels E0 to E5 are characterized by different indentations in FIG. 3. Variables "MinOccurs" and "MaxOccurs" allow each type module Mk to have a selection region 14 prescribed for it which stipulates how many subordinate variant modules M1 may be simultaneously selected within a valid configuration KF. The text sequence MinOccurs="1" MaxOccurs="1" in the <Type . . . > sequence associated with the module M0 thus means that in a valid configuration KF it is always necessary or possible to select at least and no more than one of the associated variant modules M1 ("Main") or M2 ("Satellite").

Other modules of the configuration structure 7 which relate to workflows are not depicted in the simplified illustration shown in FIGS. 2 and 3, merely for reasons of clarity.

FIG. 4 shows another text file 15 in which an information packet 3 and a context unit 10 are indicated in the form of extracts and by way of example in XML coding.

The information packet 3 is limited by the sequence <Package . . . > . . . </Package>. The information core 4 (not shown in detail) of the information packet 3 is contained within the text sequence <Content> . . . </Content>. The meta-statement 5 is contained within the text sequence <Dependencies> </Dependencies>.

The information packet 3 relates in the name of the <RefType . . . > and <RefItem . . . > entries in its meta-statement 5 to the variant "Tune Up" of the type "Workflow" and to the variant "System__003" of the type "System". The information packet 3 is defined as being associated with every stage of the workflow "Tune Up" and with all configurations of the system "System__003".

The context unit 10 is limited by the text sequence <Context> . . . </Context> and contains, in the name of its <RefType . . . > and <RefItem . . . > entries, a reference 11 to a combination of the type modules "System", "Workflow", "WorkflowMode" and "Workflow Sfp" and to its respective associated variant modules "System__003", "Tune Up", "General" and "SfpTuncalOpen". This stipulates that an information packet 3 is required for the step "TuncalOpen" in the "Tune Up" of the system "System__003".

To test the information library 2 for completeness and consistency, the above-defined criteria of completeness and consistency for the information library 2 are indicated below, on the basis of the context library 9 and the configuration structure 7, as Boolean expressions which return a binary statement value "true" or "false" as a result. These expressions may be tested in the course of the test process to determine that they can be satisfied.

In the equations introduced below, reference is made to elements and attributes of the XML terms which describe the modules MI, information packets 3 and 3' and context elements 10 and 10'. As such, the "XPath" nomenclature shown schematically in Table 1 may be used. Regarding this inherently known nomenclature, reference is made to "XPath: XML Path Language 2.0. "(2002) W3C Working Draft".

TABLE 1

| Expression | Meaning | Examples |
|---|---|---|
| /p | Absolute path | /Config/Structure |
| p/.. | Superordinate element | Type/Item/.. (= Type) |
| p@a | Attribute selection | Item@MaxOccurs, SubType@IDREF |

In accordance with the nomenclature introduced in Table 1, the absolute path /Config/Structure may denote the element <Structure> . . . </Structure> of the configuration structure 7 (see FIG. 3). The back-reference Type/Item/ . . . returns the super-ordinate element (parent element) for Type/Item, namely Type. The exemplary attribute selection Item@MaxOccurs shows the value of the attribute MaxOccurs of an <Item . . . > element. In Table 1, "a" denotes a variable for an arbitrary XML attribute and "p" denotes a variable for an arbitrary hierarchic path.

Within the XML terms contained in the text files 13 and 15, the identification names of the modules Ml are also contained in the attributes ID and IDREF. Each IDREF attribute is in this case a reference to an ID attribute of the same name, which ID attribute is defined for each type module Mk and variant module Ml outside of the configuration structure 7 (i.e. the /Config/Structure environment shown in FIG. 3) in a separate XML environment in the form /Inventory/InvTypes/InvType/Invitem.

In the provided method, the identification name of each module MI itself may be assigned a property of a Boolean variable which has the value "true" when the module of interest is selected in an arbitrary configuration and which assumes the value "false" when the module MI of interest is not present in the configuration. Accordingly, the formula m@ID or m@IDREF referring to an arbitrary <Type . . . >, <SubType . . . > or <Item . . . > element m (and hence to an arbitrary module MI) has the value "true" or "false" when the element m (or module MI) of interest may or may not be present in a configuration. As such, the variable t@ID or t@IDREF associated with a <Type . . . > or <SubType . . . > element t may be true as soon as at least one variable i@ID or i@IDREF of a subordinate <Item . . . > element i (i ϵ t/Item) is true, that is as soon as at least one variant module Ml of the type of interest is selected.

To test the completeness or consistency of the information library 2, a formula is derived which indicates whether an arbitrary configuration is valid in accordance with the configuration structure 7. This statement is shown by the statement value of the following formula $$ValidConf = \quad TypeD\ ValidConf = TypeDefs \wedge \bigvee_{\substack{t \in /Config/ \\ Structure/Type}} ValConfT(t) \qquad \text{Eq. 1}$$

ValidConf (Eq. 1) has the value "true" when a given configuration is valid, otherwise it has the value "false". The expressions TypeDefs and ValConfT(t) are in this case given by:

$$TypeDefs = \bigwedge_{\substack{t \in /Inventory \\ /InvTypes/InType}} \left( t@ID \Leftarrow \bigvee_{i \in t/InvItem} i@ID \right) \qquad \text{Eq. 2}$$

and $$ValConfT(t) = CardinalityOK(t) \wedge SubItemsValid(t) \wedge ForbidUnrefItems(t). \qquad \text{Eq. 3}$$

A configuration is valid in accordance with Eq. 1 when all <Type . . . > elements have been set and each <Type . . . > element is valid in accordance with Eq. 3. The expressions CardinalityOK(t) (Eq. 4), SubItemsValid(t) (Eq. 5) and ForbidUnrefItems(t) (Eq. 6) contained in Eq. 3 correspond to the aforementioned validity criteria T1 to T3 for a type module:

$$CardinalityOK(t) = S_{t@MinOccurs}^{t@MaxOccurs}(\{i@IDREF \mid i \in t/\mathrm{Item}\}), \qquad \text{Eq. 4}$$

$$SubItemsValid(t) = \bigwedge_{i \in t/Item} (i@IDREF \Rightarrow ValConfI(i)), \qquad \text{Eq. 5}$$

and

-continued $$ForbidUnrefItems(t) = \bigwedge_{i \in unrefItems(t)} \neg\, i@IDREF. \quad \text{Eq. 6}$$

As such, Eq. 4 is satisfied only if the number of selected variant modules (i.e. <Item . . . > elements) which are subordinate to the type module (i.e. <Type . . . > or <SubType . . . > element) of interest is within the selection range 14 spanned by MinOccurs and MaxOccurs (for the action of the operator $S_a^b(M)$ in Eq. 4, reference is made to the annex).

Eq. 5 is true only if all selected subordinate variant modules are valid in accordance with Eq. 7.

Eq. 6 tests a given configuration for unreferenced variant modules (for the definition of the expression unrefItems(t), reference is made to the annex).

The validity of a variant module is determined by the expression $$ValConfI(i) = SubTypesValid(i) \wedge ConditionValid(i) \wedge ForbidUnrefTypes(i) \quad \text{Eq. 7}$$

The expressions SubTypesValid(i), ConditionValid(i) and ForbidUnrefTypes(i) correspond in turn to the validity criteria I1 and I2 and I3, respectively. Accordingly, a variant module within the configuration to be tested is valid if all type modules which are subordinate to this module are valid, all conditions possibly linked to the variant module in question are satisfied and only subordinate type modules are selected which are associated with the variant module in question as subtypes in the configuration structure 7.

The expressions SubTypesValid(i), ConditionValid(i) and ForbidUnrefTypes(i) are given by $$SubTypesValid(i) = \bigwedge_{t \in i/SubType} ValConfT(t), \quad \text{Eq. 8}$$

$$ConditionValid(i) = \begin{cases} T, \text{ when } i/\text{Conditions} = \emptyset \\ \bigvee_{c \in i/Conditions} \\ \bigwedge_{d \in c/Conditions} DecodeOp(d), \text{ otherwise} \end{cases}$$

and $$ForbidUnrefTypes(i) = \bigwedge_{t \in unrefTypes(i)} \neg\, t@IDREF \quad \text{Eq. 10}$$

Between Eq. 3 and Eq. 7, a closed circular reference is thus formed, on the basis of which the validity of the configuration structure 7 is tested recursively as far as the bottommost hierarchic level.

Eq. 9 is trivially true (=T) when there is no condition. Otherwise, Eq. 9 is satisfied when all conditions are met. For the definition of the function DecodeOp(d), reference is likewise made to the annex, as in regard to the function unrefTypes(i) which is contained in Eq. 10.

To access information packets 3 and 3', the following three basic functions are used:

$$HelpReq(c) = \bigwedge_{t \in c/RefType} HelpTypeCond(t), \quad \text{Eq. 11}$$

$$HelpProv(p) = \bigvee_{d \in p/Dependencies} \bigwedge_{t \in d/Dependency} HelpTypeCond(t) \quad \text{Eq. 12}$$

and

-continued $$HelpTypeCond(t) = \begin{cases} \bigvee_{i \in t/RefItem} i@IDREF, \text{ when } i/RefItem \neq \emptyset \\ \bigvee_{i \in /Inventory/invTypes/t/InvItem} i@ID, \text{ otherwise} \end{cases} \quad \text{Eq. 13}$$

In Eq. 11 to 13, “p” represents an arbitrary information packet 3 and 3' and c represents an arbitrary context unit 10 and 10'.

HelpReq(c) (Eq. 11) defines whether a given context unit c requires the presence of an information packet 3 and 3' for an arbitrary configuration, while HelpProv(p) determines the situations to which a given information packet p corresponds.

The completeness of the information library 2 is now similar to or the same as the general validity of the expression $$\bigwedge_{C \in /Help/Contexts} \left( HelpReq(c) \wedge ValidConf \Rightarrow \bigvee_{p \in /Help/Packages} HelpProv(p) \right) \quad \text{Eq. 14}$$

There is an overlap between two information packets p1 and p2, and hence an inconsistency in the information library 2, when the expression $$\bigwedge_{t \in /Help/Contexts} (HelpReq(c) \wedge ValidConf \Rightarrow HelpProv(p1) \wedge HelpProv(p2)) \quad \text{Eq. 15}$$

can be satisfied. Accordingly, the information library 2 is consistent when Eq. 15 cannot be satisfied for all information packets p1≠p2.

In the test process provided, Eq. 14 and 15 may be developed from the XML coding of the information library 2, of the context library 9 and of the configuration structure 7 and are tested to determine whether they can be satisfied. In the case of Eq. 14, the negation may be tested to determine whether it can be satisfied.

One advantageous feature of this method is that the completeness and consistency of the information library does not need to be tested separately for every single possible configuration and every affected context unit. Rather, the Boolean expressions in line with Eq. 14 and 15 are checked to determine whether they can be satisfied, using current methods of propositional logic, such as SAT, with the aid of computers with significantly rationalized computation complexity.

In the event of an error (i.e. in the event of incompleteness or inconsistency), a formula may be produced which describes a set of situations in which the error occurs. This formula may be simplified using inherently known BDD methods.

In the case of a completeness error, each context unit for which a required auxiliary packet 3 does not exist is indicated, if appropriate together with the relevant configuration. In the case of a consistency error, the overlapping information packets 3 are indicated together with the relevant context.

Figure 5:
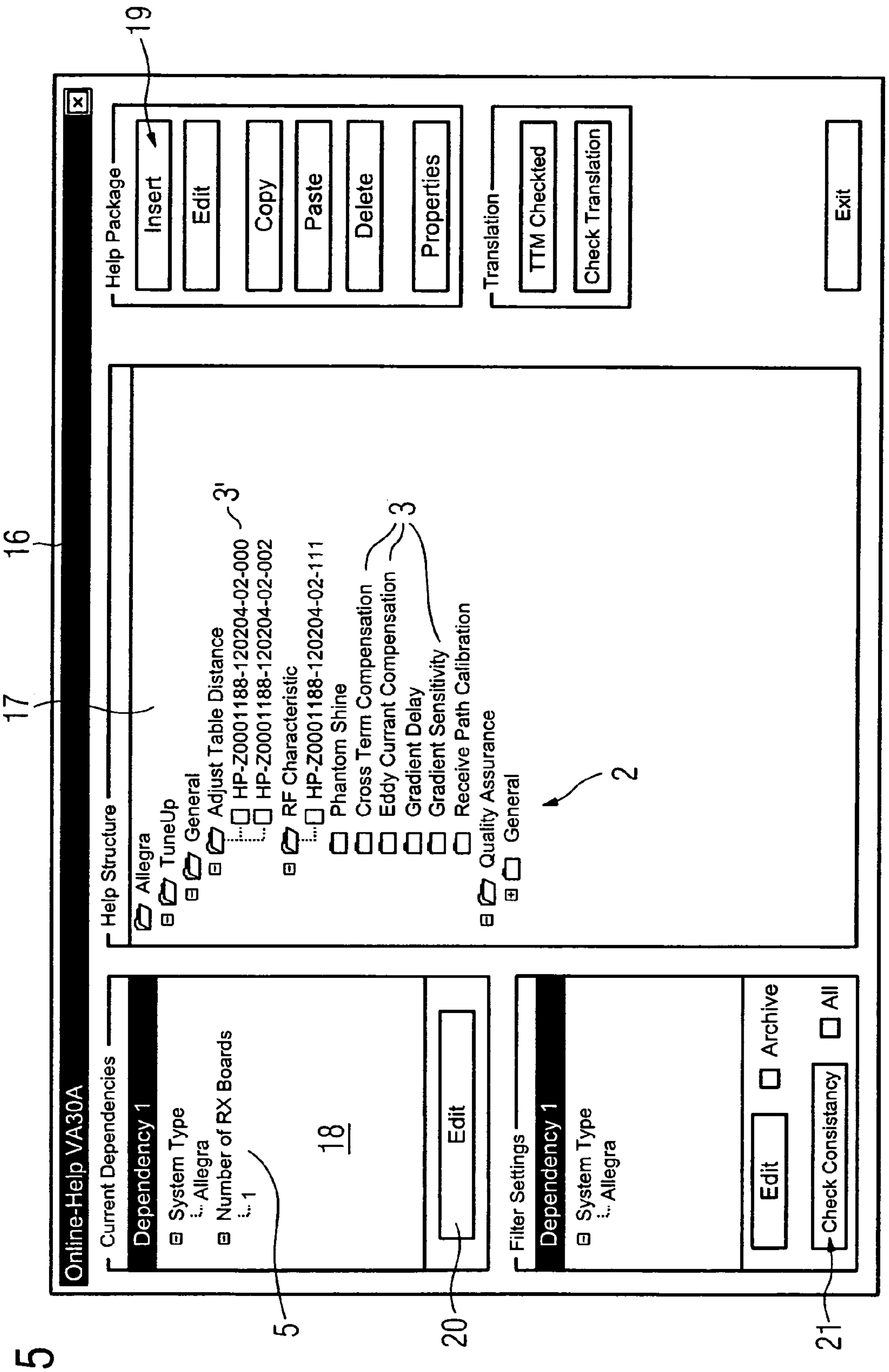
FIG. 5 shows the user interface in an editor for editing the information library and for indicating a completeness or consistency error.

These items are indicated using an editor 16 (whose user interface is shown in FIG. 5) specifically for creating and maintaining the information system 1.

The editor 16 comprises a first indicator field 17 to indicate the structure of the information library 2 and the information packets 3 contained therein. The editor 16 also includes a second indicator field 18 which indicates the meta-statement 5 of a selected information packet 3'. In addition, the editor 16 includes functional elements 19 to edit or create an information packet 3 and functional elements 20 and 21 to edit the meta-statement 5 of an information packet 3' or to start the completeness and consistency test described.

If a consistency error is detected, the overlapping information packets 3 are marked in appropriate color in the indicator field 17.

Figure 6:
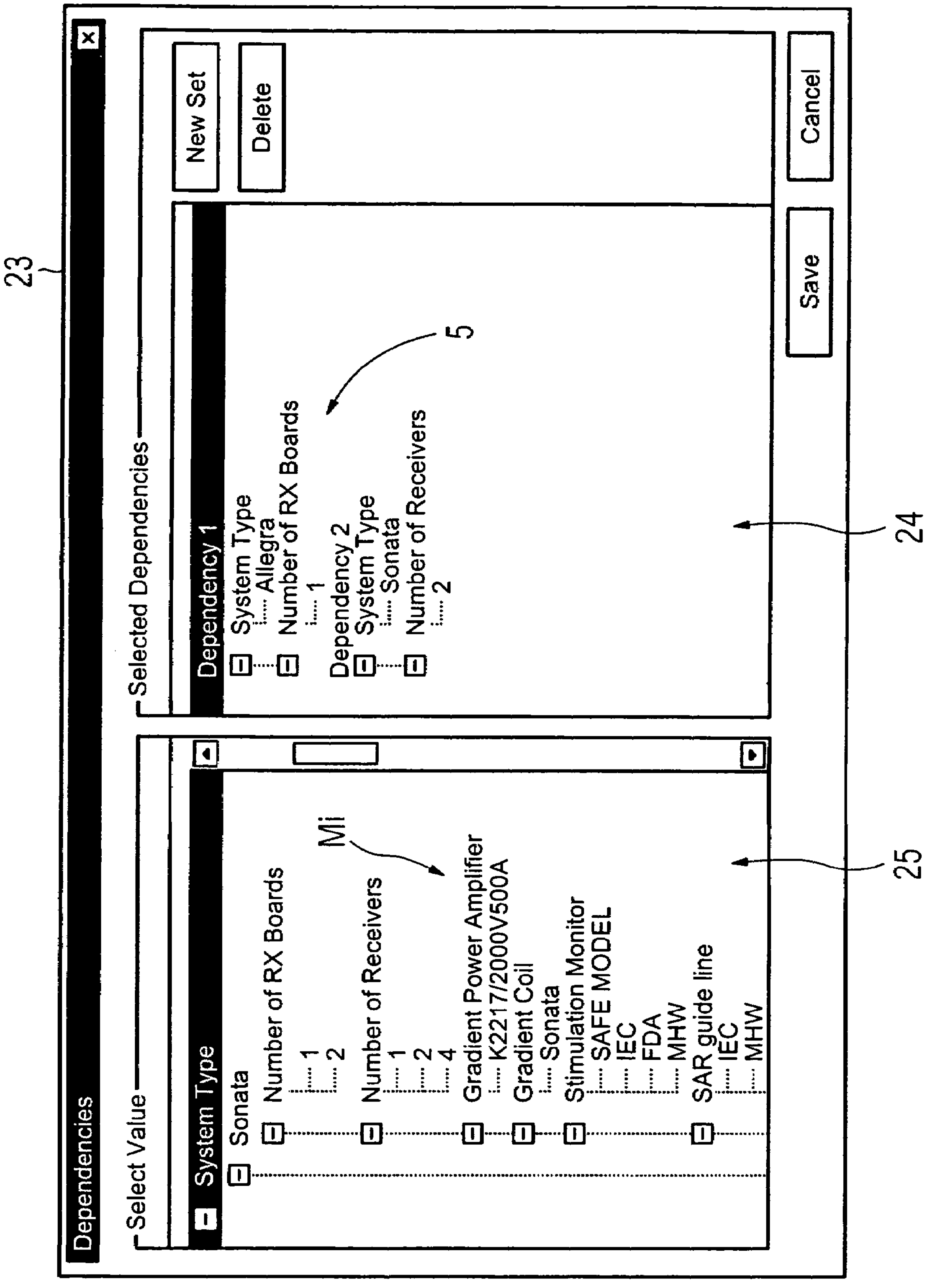
FIG. 6 shows the user interface in a further editor for editing the meta-statement in an information packet from the information library.

The meta-statement 5 of an information packet 3' is edited using a further editor 23, which is shown in FIG. 6. This editor 23 includes a first indicator field 24, which indicates the current meta-statement 5. To allow the meta-statement 5 to be edited easily and with little susceptibility to error, the editor 23 includes a further indicator field 25. This further indicator field 25 lists the modules MI of the device 6. These listed modules MI can be selected and transferred to the meta-statement 5 of the information packet 3', e.g. by clicking on a mouse. Similarly, available associations for modules MI can be removed from the current meta-statement 5 of the information packet 3'.

Annex $$DecodeOp(d) = \begin{cases} d\,@\text{Value, when } d\,@\,Op = \text{“}eq\text{”}, \\ \neg\, d\,@\text{Value, when } d\,@\,Op = \text{“}ne\text{”} \end{cases} \quad \text{Eq. A1}$$

$$unrefItems(t) = allItems(t) \setminus t/\text{Item} \quad \text{Eq. A2}$$

$$allItems(t) = \bigcup_{t'@ID=t@IDREF} /\text{Inventory}/InvTypes/t'/InvItem \quad \text{Eq. A3}$$

$$unrefTypes(i) = (refTypesT(i/\ldots) \setminus \{i/\ldots\}) \setminus refTypesI(i) \quad \text{Eq. A4}$$

$$refTypesT(t) = \{t\} \cup \bigcup_{i \in t/Item} refTypesI(t) \quad \text{Eq. A5}$$

$$refTypesI(i) = \bigcup_{t \in i/RefType} refTypesT(t) \quad \text{Eq. A6}$$

$$S_a^b(M) = \begin{cases} S^b(M), & \text{when } a = 0 \\ S^b(M) \wedge \neg S^{a-1}(M), & \text{otherwise} \end{cases} \quad \text{Eq. A7}$$

$$S^b(M) = \bigwedge_{\substack{K \subseteq M \\ |K|=b+1}} \bigvee_{f \in K} \neg f \quad \text{Eq. A8}$$

It is therefore intended that the foregoing detailed description be regarded as illustrative rather than limiting, and that it be understood that it is the following claims, including all equivalents, that are intended to define the spirit and scope of this invention.

The invention claimed is:

1. A method for checking a completeness and consistency of an information library which is associated with a plurality of modules from which a device is put together in accordance with a prescribed configuration structure, the method comprising:

providing the information library with a plurality of information packets, each of which comprises an information core and a meta-statement which defines the association between the respective information packet and at least one of the plurality of modules;

prescribing a context library which comprises a plurality of context units, each of the plurality of the context units comprising a reference to a combination of the plurality of modules, the combination associated with a presence of one of the information packets;

checking whether there is an information packet in the information library that corresponds to each context unit within one or more valid configurations of the prescribed configuration structure and determining that the information library is complete when there are information packets in the information library that corresponds to each different context unit within the one or more valid configurations and determining that the information library is incomplete when one or more context units within one or more valid configurations have no corresponding information packets in the information library; and checking whether there is only one information packet in the information library that corresponds to each context unit within the one or more valid configurations and determining that the information library is consistent when there is only one information packet in the information library that corresponds to each different context unit within the one or more valid configurations and determining that the information library is inconsistent when a context unit corresponds to at least two corresponding and competing information packets.

2. The method as claimed in claim 1, further comprising, when the information library is found to be incomplete by the testing:

indicating each of the plurality of context units for which there is no corresponding information packet or the combination of modules which is specified in the reference in this context unit.

3. The method as claimed in claim 2, further comprising, when the information library is found to be inconsistent by the testing:

indicating the information packets which correspond to one and the same context unit in terms of one and the same configuration.

4. The method as claimed in claim 2, further comprising:

storing the configuration structure, the information library, and the context library as text files in an XML format.

5. The method as claimed in claim 2, further comprising:

storing the configuration structure as a tree structure with a plurality of hierarchic levels, within which tree structure the plurality of modules are hierarchically associated with one another.

6. The method as claimed in claim 1, further comprising, when the information library is found to be inconsistent by the testing:

indicating the information packets which correspond to one and the same context unit in terms of one and the same configuration.

7. The method as claimed in claim 6, further comprising:

storing the configuration structure, the information library, and the context library as text files in an XML format.

8. The method as claimed in claim 6, further comprising:

storing the configuration structure as a tree structure with a plurality of hierarchic levels, within which tree structure the plurality of modules are hierarchically associated with one another.

9. The method as claimed in claim 1, further comprising:

storing the configuration structure, the information library, and the context library as text files in an XML format.

10. The method as claimed in claim 9, further comprising:

storing the configuration structure as a tree structure with a plurality of hierarchic levels, within which tree structure the plurality of modules are hierarchically associated with one another.

11. The method as claimed in claim 1, further comprising: storing the configuration structure as a tree structure with a plurality of hierarchic levels, within which tree structure the plurality of modules are hierarchically associated with one another.

12. The method as claimed in claim 11, wherein the plurality of modules comprise type modules and variant modules, and wherein successive hierarchic levels in the configuration structure alternately hold type modules and variant modules, with a first type module having at least one associated variant module directly subordinate to the first type module.

13. The method as claimed in claim 12, wherein the configuration of the plurality of modules is recognized as being valid if each type module and each variant module within the configuration meet prescribed validity criteria.

14. The method as claimed in claim 13, wherein the validity criteria tested for a type module in a configuration are:

whether a number of variant modules selected as being subordinate to the type module is within a prescribed selection range;

whether each of the variant modules meets prescribed validity criteria; and whether the variant modules in the configuration which are selected as being subordinate to the type module are only those which are admissibly made subordinate to this type module in accordance with the configuration structure.

15. The method as claimed in claim 13, wherein the validity criteria tested for a variant module in a configuration are:

whether each type module selected as being subordinate to this variant module meets prescribed validity criteria, whether each condition associated with the variant module is met, and whether the type modules in the configuration which are selected as being subordinate to the variant module are only those which are admissibly made subordinate to the variant module in accordance with the configuration structure.

16. A method for checking a completeness and consistency of an information library for a medical device, the information library being associated with a plurality of modules for the medical device, the plurality of modules having a prescribed configuration structure, the method comprising:

providing the information library with a plurality of information packets, each of which contains an information core and a meta-statement which defines the association between the respective information packet and at least one of the plurality of modules;

prescribing a context library which comprises a plurality of context units, each of the plurality of the context units containing a reference to a combination of the plurality of modules from the magnetic resonance tomography device, the combination associated with a presence of one of the information packets;

checking whether there is an information packet in the information library that corresponds to each context unit within one or more valid configurations of the prescribed configuration structure and determining that the information library is complete when there is an information packet in the information library that corresponds to each context unit within the one or more valid configurations; and checking whether there is only one information packet in the information library that corresponds to each context unit within the one or more valid configurations and determining that the information library is consistent when there is only one information packet in the information library that corresponds to each context unit within the one or more valid configurations.

17. The method as claimed in claim 16, wherein the medical device is a magnetic resonance tomography device.

18. The method as claimed in claim 17, wherein the modules are parts of the tomography, such as hardware, software, workflows, or any combination thereof.

* * * * *